Nov. 4, 1924.  1,514,521

F. HICKOK
TRACTOR
Filed May 11, 1921  2 Sheets-Sheet 1

Inventor
Frank Hickok
By John S. Barker
his Attorney

Nov. 4, 1924.　　　　　　　　　　　　　　1,514,521
F. HICKOK
TRACTOR
Filed May 11, 1921　　　　2 Sheets-Sheet 2

Inventor
Frank Hickok.
By John S. Barker
his Attorney

Patented Nov. 4, 1924.

1,514,521

UNITED STATES PATENT OFFICE.

FRANK HICKOK, OF CARTHAGE, MISSOURI.

TRACTOR.

Application filed May 11, 1921. Serial No. 468,482.

*To all whom it may concern:*

Be it known that I, FRANK HICKOK, a citizen of the United States, residing at Carthage, in the county of Jasper and State of Missouri, have invented certain new and useful Improvements in Tractors, of which the following is a specification.

My invention relates to tractors of the type in which in place of the ordinary traction wheels with rotating spokes and hubs there are used annular traction rims rotating about stationary frames that support such rims and also the gearing that immediately drives them. The improvements constituting my invention will be pointed out in the following specification and are illustrated in the accompanying drawings in which—

Figure 1:
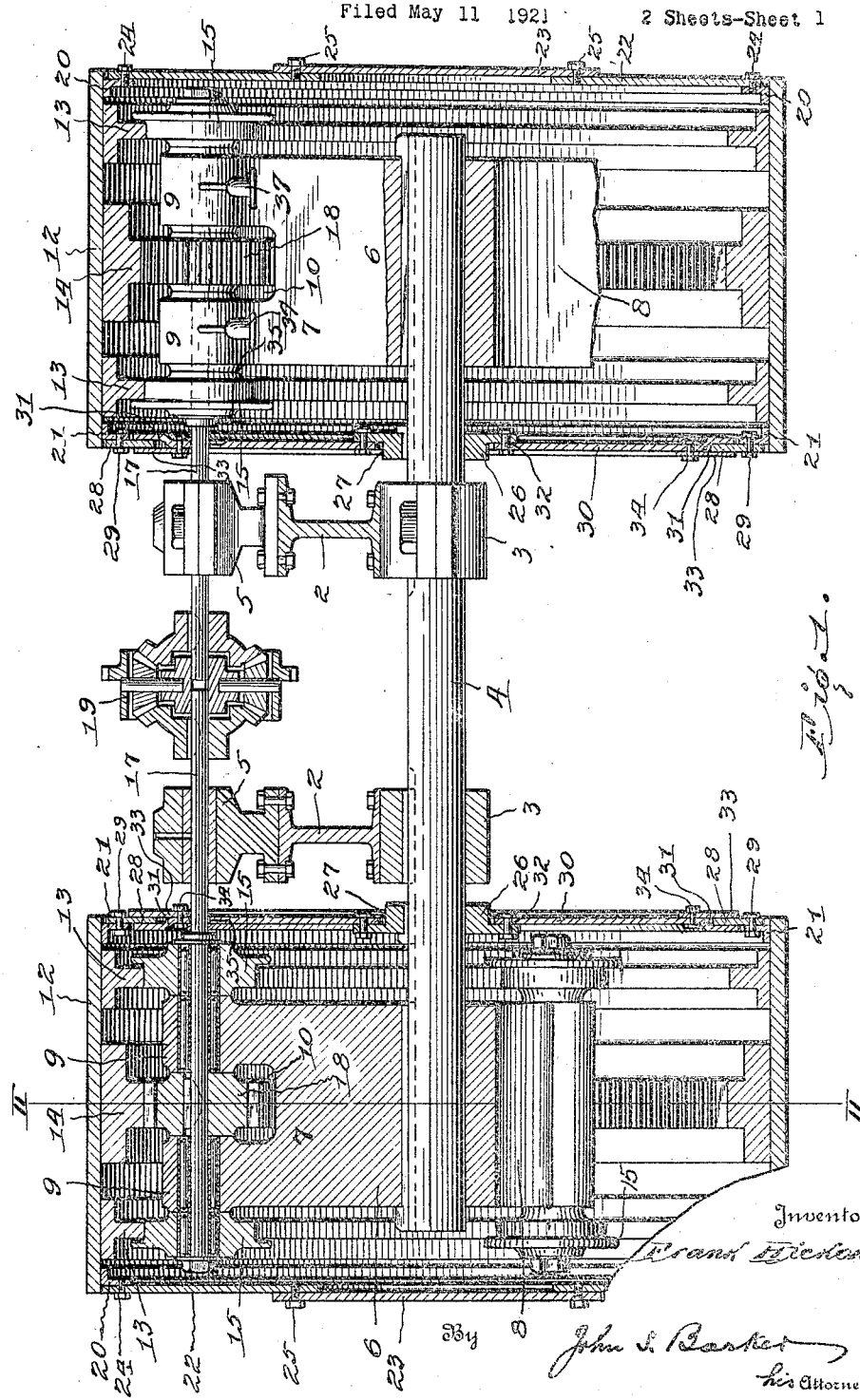
Figure 1 is a transverse vertical section through the driving mechanism of a tractor.
Figure 2:
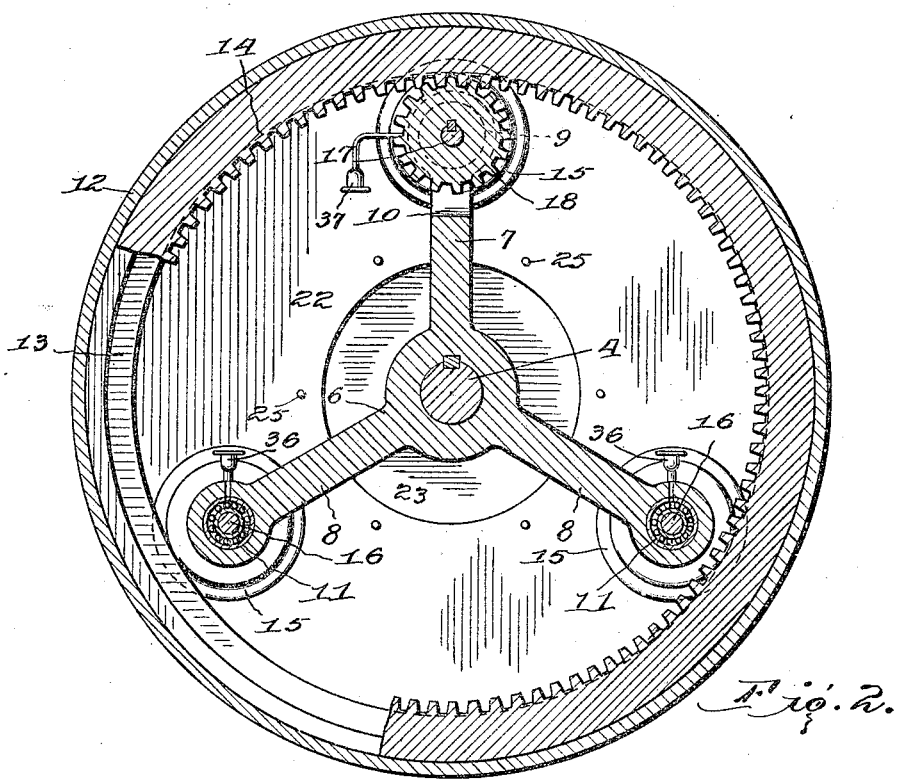
Fig. 2 is a vertical section taken on the line II—II of Fig. 1 a segment of the central gear rack being broken away.
Figure 3:
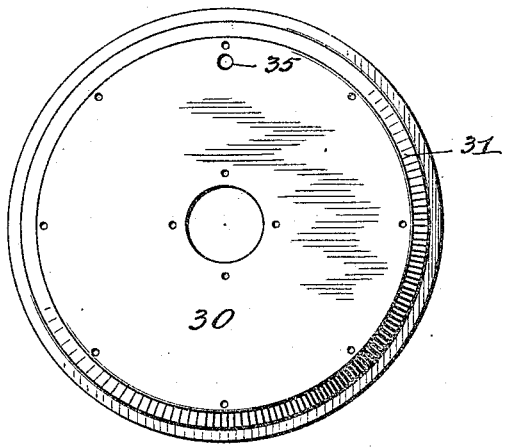
Figs. 3 and 4 are detail views, in elevation, of elements of the means employed for closing the driving gearing and excluding dirt and moisture therefrom.
Figure 4:
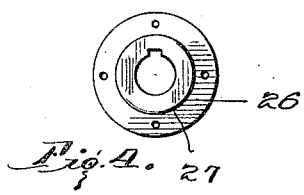

Referring to the drawings 2, 2 indicate a pair of longitudinal I-beams constituting part of the running gear of the vehicle. They characterize, and for the purposes of this invention are sufficient illustration of, the entire supporting frame. To them, preferably to the undersides thereof, are secured bearings 3, 3 in which is keyed the main axle 4. Upon this axle, and near its opposite ends, are secured a pair of rigid frames 6, 6, which are non-rotatable, being respectively keyed to the axle. Each frame is integral and preferably consists of three arms or webs radiating from a hub, an upper arm 7, and two downwardly extending and diverging arms 8, 8. These arms are approximately equi-distant apart and of equal length, though these proportions may be varied. The upper arm 7 is provided with a pair of bearings 9, 9, separated by an open space or recess 10, in which turns a shaft 17, that is the main drive shaft of the traction rim. The lower arms 8, 8 carry bearings 11, 11, in which are supported rotatable shafts 16. Surrounding each frame 6, supported thereby and rotatable relative thereto, is a traction rim 12. This rim is broad so as to secure a sufficiently wide engagement with the soil for traction purposes, and is provided with a tire or with soil-engaging lugs according to the use to which the tractor is to be put. But as these form no part of the present invention the outer faces of the rims shown in the drawings are represented as smooth. Upon the inner face of each rim 12 are secured a pair of tracks 13, 13, and a gear rack 14, the tracks being preferably near the opposite edges of the rim and the gear at the transverse center thereof.

Flanged wheels 15 secured respectively to the shafts 16, 16, and 17 engage with the tracks 13, 13, while a pinion 18 secured fast to the drive shaft 17 and located between the bearings 9, 9, and turning in the recess 10, is in mesh with the gear rack 14 and drives the rim. The several wheels 15 constitute a double three-point rolling support for the rim about which it turns, as driven by the pinion 18.

The shaft 17 is driven from a motor carried by the frame of the vehicle, through any suitable train of gearing, which I have indicated merely by the differential gear 19. As will be seen by reference to Fig. 1 there are two traction rims in line, transversely, with each other, and a drive shaft 17 for each rim, and each shaft is supported in the bearings 9, 9, of a frame 6, and a bearing 5 supported by the I-beam 2. The shafts enter the gear case of the differential 19 from opposite sides as is common in drive mechanism of this kind, and permit either wheel to turn faster than the other as may be required under well known conditions met with in propelling a tractor or motor driven vehicle.

The radiating arms 7, 8 of the frames 6 and the wheels 15 which they support are so disposed that they take and properly distribute the thrusts and reactions incident to the driving engagement of the pinions 18 with the gear rims, thus insuring good operative relationship between the driving and the driven parts. The driving pinions 18 are located in the upper portions of the spaces surrounded by the traction rims, with the result that dirt which is picked up by the rims and which finds its way into contact with the rim gears 14 is given an opportunity to fall away from the rims before the latter are engaged by the pinions 18, thus reducing friction and wear incident to the presence of dirt and abrading material.

In order to close in the gearing within the rim 12 and, as far as possible to exclude dust and moisture therefrom I have devised the following boxing-in or enclosing means. 20, 21 are annular angles secured to the inner face of the rim 12 outside of the tracks 13 and near the opposite edges of the rim. To the outer angle, 20, is secured an annular plate 22, as by removable bolts 24. A central opening through this plate permits access to the interior of the rim for the purposes of examining the gearing therein, lubrication, repairs, etc. This opening is covered by a center plate or disk 23 that is removably secured to the annular plate 22 by bolts 25. To the opposite angle 21 is removably secured a narrow annular rim 28, by the bolts 29. 26 indicates a collar keyed to the shaft 4 and hence non-rotatable. The outer face of this collar is rabbetted at 27 to receive and support an annular plate 30 that is removably secured thereto by bolts 32. The outer edge of the annular plate 30 is offset as indicated at 31 to form a flange that overlies, on the inner side, the annular rim 28, and opposite to which sets an annular rim 33, removably secured to the plate 30 by the bolts 34. It will be seen from this description and reference to Fig. 1 that the annular disk 28, which is carried by the traction rim, revolves in a channel formed by the offset portion 31 of the closing plate 30 and the rim 33 secured to such plate. It is possible to make the running joint thus formed quite close and practically dust and water proof.

The closing plate 30 is provided with an opening 35 through which passes the drive shaft 17.

Suitable means for lubricating the bearings for the shafts 16 and 17 are provided. Thus 36, 36 represent oil cups connected with the bearings for the shafts 16 and arranged so that lubricant is fed thereto by gravity. 37, 37 are lubricating means connected with bearings 9, 9, for the shaft 17, of a force-feed type. I do not wish to be limited in the practice of my invention to this arrangement for lubrication, that shown being merely illustrative. The several oil cups are located within the enclosure of the traction rim and the end closing plates therefor and are hence protected, but are easily accessible upon removing the plate 23.

The traction rim may be easily removed whenever this is found to be desirable. To accomplish this it is only necessary to take off the outer closing plate 22, remove the three outer supporting wheels 15, and disconnect the annular rim 28 from the angle 21, when the traction rim will be free to be slipped off.

It should be understood that the accompanying drawings are merely illustrative of the invention here presented and are not intended as working drawings, and that therefore there may be wide variation from the showing in the drawings in mechanical details without departing from the spirit of the invention herein disclosed.

What I claim is:—

1. In a tractor, the combination with the frame of the vehicle, of a non-rotating axle rigidly supported thereby, non-rotating frames secured to the axle near its ends, each frame having a plurality of radiating arms spaced apart from each other, relatively broad traction rims surrounding the said frames and concentric with the axle, rollers supported by the arms of the said frames and engaging interiorly with the traction rims to support and maintain them in place, driving shafts supported by the frame of the vehicle and also by the non-rotating frames within the rims, and gearing between the said driving shafts and traction rims by which the latter are turned the radiating arms and rollers which they support being disposed so the rollers take and distribute the thrusts and reactions incident to the driving engagement of the gearing with the traction rims.

2. In a tractor, the combination with the frame of the vehicle, of a non-rotating axle rigidly supported thereby, frames, each comprising a hub secured to the axle near one end and a plurality of spaced apart radiating arms, traction rims surrounding the said frames, shafts carrying rollers that interiorly engage with the traction rims and maintain them in position supported in the arms of the frames, driving shafts supported by the frame of the vehicle and also by certain of the arms of the frames within the rims, which arms are divided to provide separated bearings for the driving shafts, and gears for driving the rims secured to the driving shafts and located within the spaces between the separated bearings, the driving shafts serving also as supports for certain of the aforesaid rollers.

3. In a tractor, a broad traction rim, means for supporting and driving it located within the space bounded by the edges of the rim, and means for closing an end of the rim comprising a rigidly supported collar concentric with the axis of rotation of the rim, an annular plate removably secured to the collar, the outer edge of the plate being offset, a stationary annular rim removably secured to the plate opposite the offset portion thereof, so as to form an annular channel between the offset portion and said rim, and an annular rim secured to the traction rim and having its inner edge lying in the channel between the offset portion of the stationary plate and the annular rim carried thereby.

FRANK HICKOK.